(12) United States Patent
Islam et al.

(10) Patent No.: US 11,431,228 B2
(45) Date of Patent: Aug. 30, 2022

(54) IN-WHEEL MOTOR WITH COOLING SYSTEM

(71) Applicant: MANDO CORPORATION, Gyeonggi-do (KR)

(72) Inventors: Mohammad Islam, Bay City, MI (US); Christian Ross, Bay City, MI (US); Christopher William Lutz, Bay City, MI (US); Tomy Sebastian, Bay City, MI (US); Md Sariful Islam, Bay City, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 31 days.

(21) Appl. No.: 17/191,677

(22) Filed: Mar. 3, 2021

(65) Prior Publication Data

US 2021/0281149 A1 Sep. 9, 2021

Related U.S. Application Data

(60) Provisional application No. 62/985,318, filed on Mar. 4, 2020.

(51) Int. Cl.
*H02K 9/20* (2006.01)
*H02K 7/00* (2006.01)
(Continued)

(52) U.S. Cl.
CPC .......... *H02K 9/20* (2013.01); *B60B 27/0052* (2013.01); *B60B 27/0068* (2013.01);
(Continued)

(58) Field of Classification Search
CPC ... B60C 23/126; B60C 23/131; B60C 29/005; B60C 2200/04; B60C 23/10; F16K 15/20;
(Continued)

(56) References Cited

U.S. PATENT DOCUMENTS

| 2006/0174642 A1* | 8/2006 | Nagashima | H02K 9/19 62/119 |
| 2006/0174643 A1* | 8/2006 | Ostrom | H05K 7/20936 62/119 |

(Continued)

FOREIGN PATENT DOCUMENTS

| CA | 2942812 A1 * | 9/2014 | ......... E21B 41/0085 |
| WO | WO-2019131907 A1 * | 7/2019 | ............... B60K 1/00 |

*Primary Examiner* — Naishadh N Desai
(74) *Attorney, Agent, or Firm* — Ladas & Parry, LLP (57) ABSTRACT

A vehicle wheel assembly comprises a wheel for mounting a tire thereon and having an inner space; and an in-wheel motor mounted in the inner space of the wheel and comprising: a rotor connected to the wheel and configured to rotatable relative to a stator, the stator configured to drive the rotor, an electronic device comprising a circuit board and electronics mounted on the circuit board and configured to control the in-wheel motor, two-phase dielectric material, and covers coupled with the stator to form a hermetic enclosure. The electronic device and the two-phase dielectric material are contained in the hermetic enclosure formed by the wall of the stator and the covers coupled with stator, and the two-phase dielectric material is in contact with the wall of the stator and the electronic device to cool the stator and the electronic device by transitioning between a liquid phase and a gaseous phase, conduction, and convection.

20 Claims, 8 Drawing Sheets

(51) Int. Cl.

| | |
|---|---|
| *H02K 7/102* | (2006.01) |
| *H02K 7/08* | (2006.01) |
| *H02K 9/22* | (2006.01) |
| *H02K 11/21* | (2016.01) |
| *B60K 7/00* | (2006.01) |
| *B60B 27/00* | (2006.01) |
| *G01B 7/30* | (2006.01) |
| *G01D 5/14* | (2006.01) |
| *H02K 1/2706* | (2022.01) |
| *H02K 11/00* | (2016.01) |

(52) U.S. Cl.
CPC ............. *B60K 7/0007* (2013.01); *G01B 7/30* (2013.01); *G01D 5/14* (2013.01); *H02K 1/2706* (2013.01); *H02K 7/006* (2013.01); *H02K 7/085* (2013.01); *H02K 7/102* (2013.01); *H02K 9/225* (2021.01); *H02K 9/227* (2021.01); *H02K 11/0094* (2013.01); *H02K 11/21* (2016.01); *B60K 2007/0038* (2013.01); *B60K 2007/0092* (2013.01)

(58) Field of Classification Search
CPC ............ B60B 27/0052; B60B 27/0068; B60K 2007/0038; B60K 2007/0092; B60K 7/0007; G01B 7/30; G01D 11/245; G01D 5/14; G01D 5/145; G04B 31/00; G04C 15/00; H01L 21/2257; H01L 21/28525; H01L 29/66606; H01L 29/78; H02K 1/2706; H02K 11/0094; H02K 11/21; H02K 11/215; H02K 11/33; H02K 5/161; H02K 7/006; H02K 7/085; H02K 7/102; H02K 7/14; H02K 9/20; H02K 9/225; H02K 9/227; Y02T 10/64

See application file for complete search history.

(56) References Cited

U.S. PATENT DOCUMENTS

| | | | |
|---|---|---|---|
| 2019/0242448 A1* | 8/2019 | Ross | B60T 13/746 |
| 2020/0395878 A1* | 12/2020 | Takahashi | H02K 1/2786 |
| 2021/0211069 A1* | 7/2021 | Reed | H02N 2/12 |

\* cited by examiner

IN-WHEEL MOTOR WITH COOLING SYSTEM

CROSS REFERENCE TO RELATED APPLICATION(S)

This application claims the benefit of U.S. Patent Application Ser. No. 62/985,318, filed on Mar. 4, 2020, entitled "INTEGRATED IN-WHEEL PROPULSION ASSEMBLY", which is all hereby incorporated herein by reference in its entirety.

BACKGROUND

Various embodiments of the present disclosure generally relate to an electric motor for rotating a wheel on a vehicle and electronics associated with operation and drive of the electric motor and more particularly to an apparatus and method for controlling internal heating of an in-wheel motor during operation.

Electromagnetic motors produce internal heating during their operation. This internal heating is due to electrical power dissipated in resistive heating of conductive coils, as well as frictional and core losses, inside the device. Many components included in the electromagnetic motors are adversely affected by increased temperature. The internal heating is detrimental to device performance and reliability of the electromagnetic motors in that it produces an increased operating temperature. For example, the internal temperature increase causes the electrical resistance of the electromagnet coil windings. Given a fixed device supply voltage, the motor windings carry less current as their resistance increases. This reduced current results in less electromagnetic force produced by the coils. In this way, the motors may become less powerful as they heat up due to internal power dissipation leading to unmitigated temperature rise in the electromagnet windings. Therefore, maintaining appropriate operating temperatures would simplify design, lower cost, and benefit device life and performance levels. However, many cooling systems of conventional electromagnetic motors make the motor over-sized and are excessively difficult and expensive to manufacture.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various exemplary embodiments of the present disclosure, a vehicle wheel assembly may comprise a wheel for mounting a tire thereon and having an inner space; and an in-wheel motor mounted in the inner space of the wheel and configured to drivingly rotate the wheel, the in-wheel motor comprising: a rotor connected to the wheel and configured to rotatable relative to a stator, the stator configured to drive the rotor, an electronic device comprising a circuit board and electronics mounted on the circuit board and configured to control the in-wheel motor, two-phase dielectric material, and one or more covers coupled with the stator to form a hermetic enclosure.

The electronic device and the two-phase dielectric material may be contained in the heretic enclosure formed by the wall of the stator and the covers coupled with stator, and the two-phase dielectric material may be in contact with the wall of the stator and the electronic device so that the two-phase dielectric material can change temperature of the stator and the electronic device by transitioning between a liquid phase and a gaseous phase, conduction, and convection. The hermetic enclosure formed by the inner wall of the stator and the covers coupled with stator may hermetically enclose the two-phase dielectric material to prevent leakage of the two-phase dielectric material.

The two-phase dielectric material is a material configured to be transitionable between a liquid phase and a gaseous phase in a predetermined operating temperature range. The boiling point of the two-phase dielectric material may be between 30° C. and 100° C. at atmospheric pressure. 30% to 90% of a volume of the hermetic enclosure formed by the inner wall of the stator and the coupled with stator may be filled with the two-phase dielectric material.

One or more of the covers coupled with the stator may have a heat sink on its outer surface so that heat transferred from the two-phase dielectric material to the covers can be dissipated through the heat sink.

In certain exemplary embodiments of the present disclosure, the in-wheel motor may be configured to have 48 stator slots and 40 rotor poles.

According to some embodiments of the present disclosure, the vehicle wheel assembly may further comprise a brake actuator configured to apply brake to the wheel or the rotor. A single integrated processor or electronic control unit (ECU) mounted on the circuit board located within the hermetic enclosure formed by the wall of the stator and the covers coupled with stator may be configured to control both the in-wheel motor and the brake actuator.

The electronics of the electronic device mounted on the circuit board comprise a first switch module configured to control the current supplied to conductors of the stator and a second switch module configured to control power supplied to the brake actuator. The single integrated processor or electronic control unit mounted on the circuit board controls the first and second switch modules. A capacitor module may be mounted on the circuit board and be configured as an energy storage device and filter current flow to the first and/or second switch modules. A wire may electrically connect the electronic device contained within the hermetic enclosure and the brake actuator disposed outside the hermetic enclosure so that a single integrated processor or ECU mounted on the circuit board can control the brake actuator.

According to certain embodiments of the present disclosure, the vehicle wheel assembly may further comprise a magnet mounted to a center portion of the rotor rotatably coupled with a bearing assembly and arranged at a rotation axis of the wheel; and a rotary sensor disposed in sensing relationship with the magnet mounted to the center portion of the rotor, and configured to be responsive to rotation of the magnet for generating a signal. The magnet may be mounted to a distal end of the center portion of the rotor. The rotary sensor and the magnet of the rotor mounted to the center portion of the rotor may be arranged to be collinear with the rotation axis of the wheel. The magnet of the rotor mounted to the center portion of the rotor may be disposed between the bearing assembly and a vehicle frame or body. A wire may electrically connect the circuit board contained within the hermetic enclosure and the rotary sensor disposed outside the hermetic enclosure so that a single integrated processor or ECU mounted on the circuit board can receive the signal generated by the rotary sensor.

Accordingly, certain embodiments of the present disclosure including the hermetic enclosure formed by the wall of the stator and the covers coupled with stator and containing two-phase dielectric material and the electronic device therein and/or a single integrated processor or ECU for controlling both the in-wheel motor and the brake actuator may efficiently cool electronics for the in-wheel motor and the brake actuator, and reduce manufacturing costs as well as the complexity of the motor construction.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
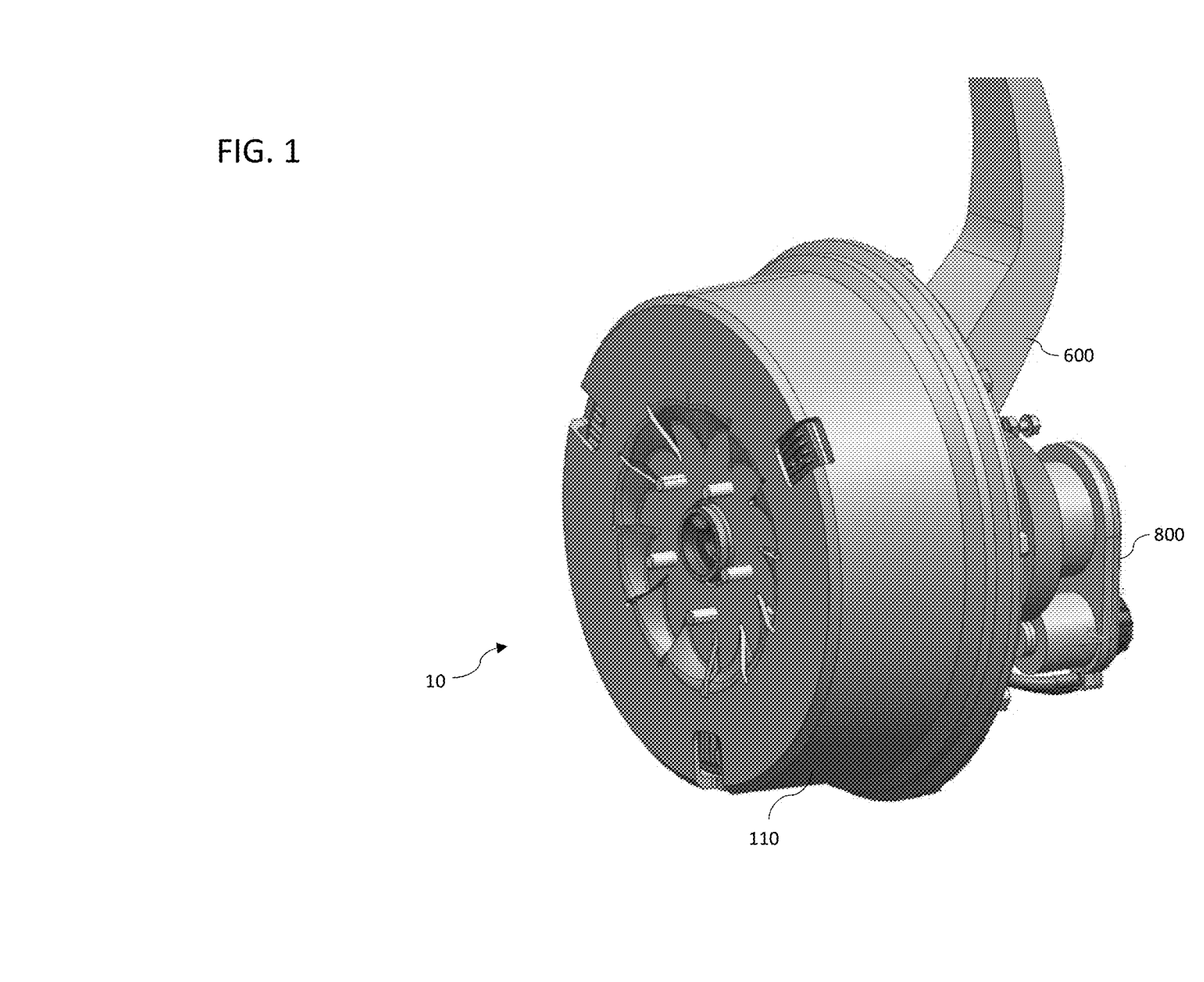
FIG. 1 is a front perspective view of a vehicle wheel assembly according to an exemplary embodiment of the present disclosure.
Figure 2:
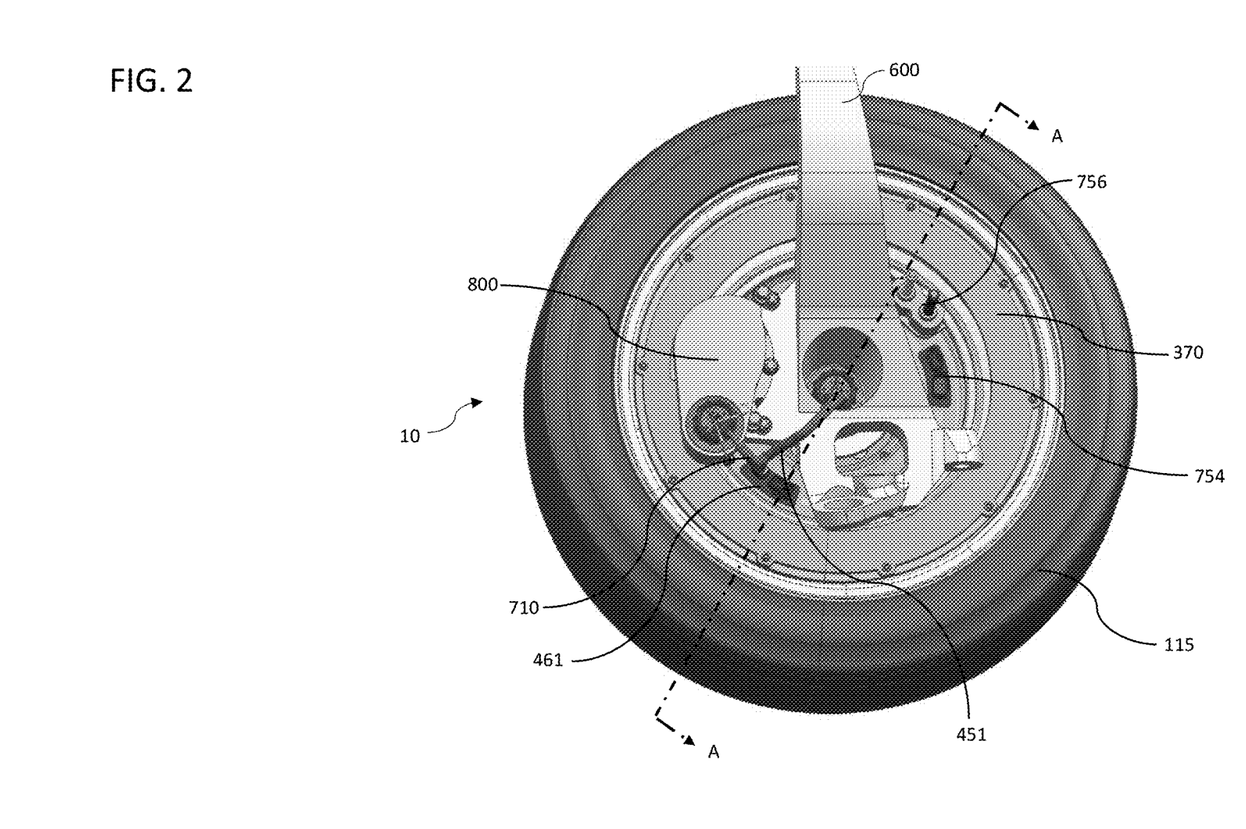
FIG. 2 is a rear view of a vehicle wheel assembly according to an exemplary embodiment of the present disclosure.

Referring to FIGS. 1, 3, 4 and 8, a vehicle wheel assembly 10 includes an electric in-wheel motor 100 and a wheel 110. The vehicle wheel assembly 10 may be coupled to a vehicle body or frame 25 and/or other suitable suspension components of a vehicle 20 via a connection structure 600 (e.g. an axle, knuckle or upright). The in-wheel motor 100 may be disposed within the wheel 110. A tire 115 is mounted on and secured to an outer circumferential surface of the wheel 110. The vehicle wheel assembly 10 may be installed at each of all four wheels 110-1 to 110-4 of the vehicle 10. Alternatively, the vehicle wheel assembly 10 may be incorporated into only two front wheels 110-1, 110-2 or only two rear wheels 110-3, 110-4 of the vehicle 20. The vehicle 20 may have a battery 30 for supplying a power source for the in-wheel motor 100. The battery 30 is electrically connected to the in-wheel motor 100 via a connector and wire 756 of FIGS. 2, 4 and 7.

Figure 3:
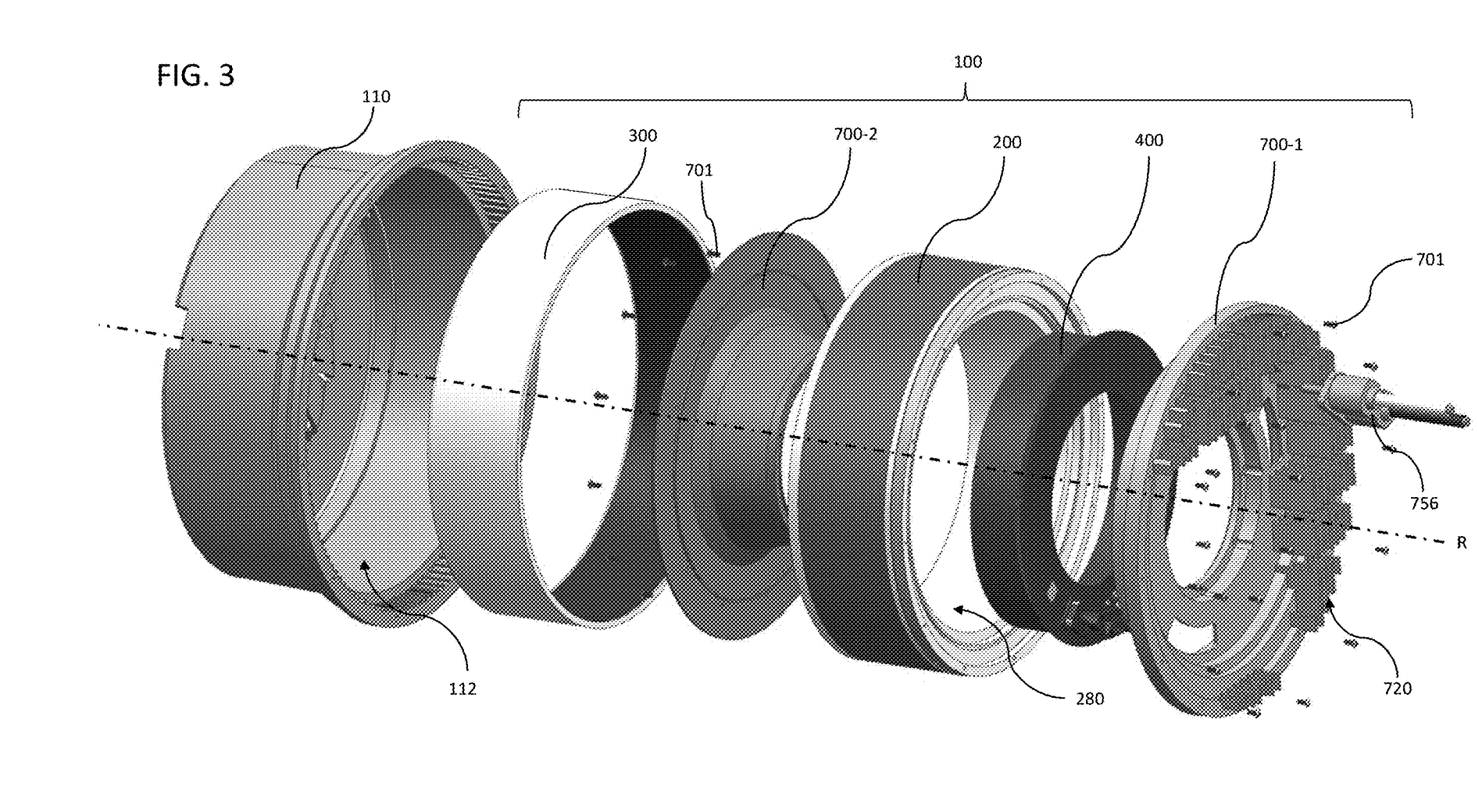
FIG. 3 is an exploded view of a vehicle wheel assembly according to an exemplary embodiment of the present disclosure.
Figure 4:
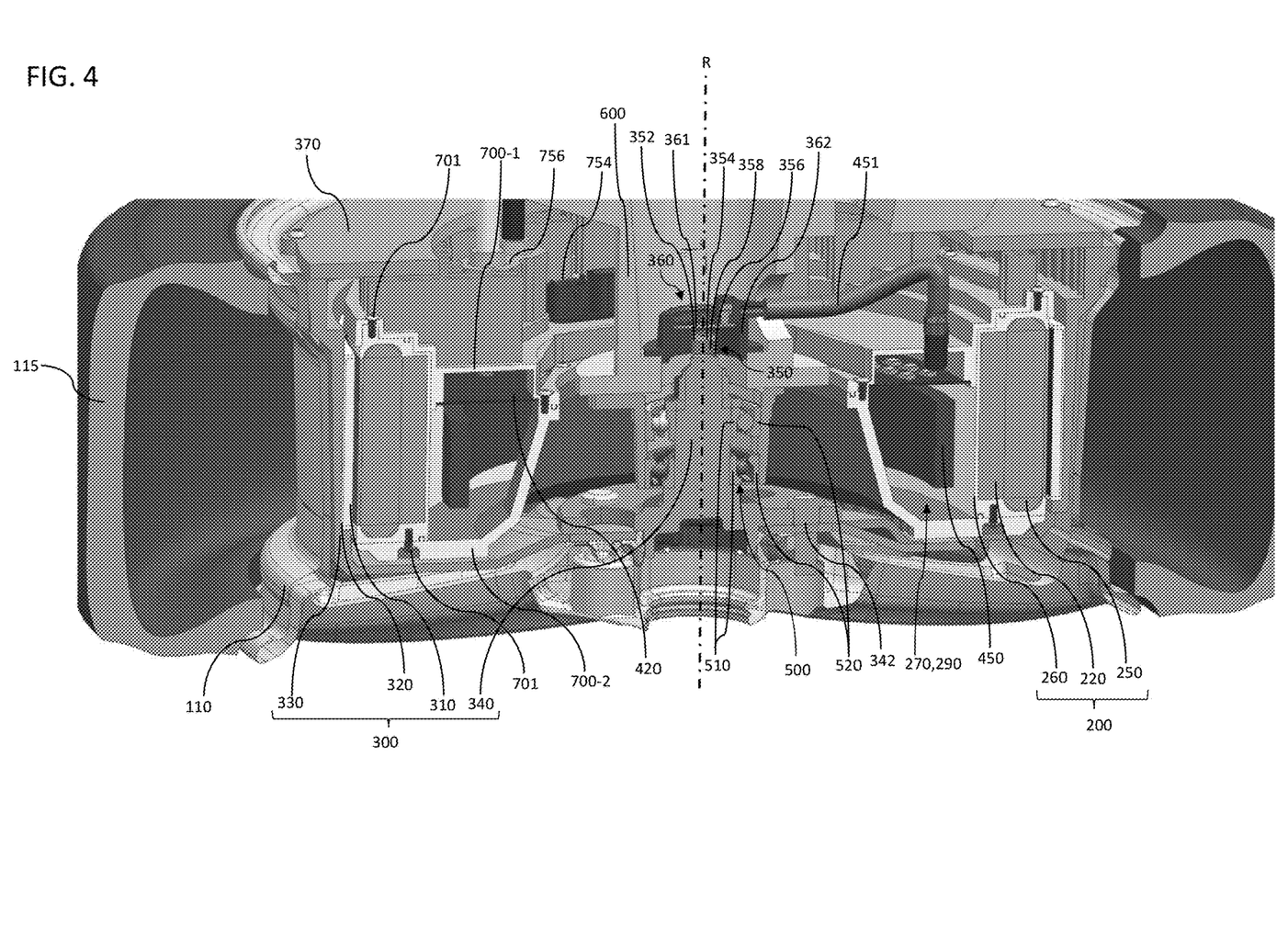
FIG. 4 is a partial cross-sectional view of a vehicle wheel assembly taken at cross-section A-A of FIG. 2 according to an exemplary embodiment of the present disclosure.
Figure 5:
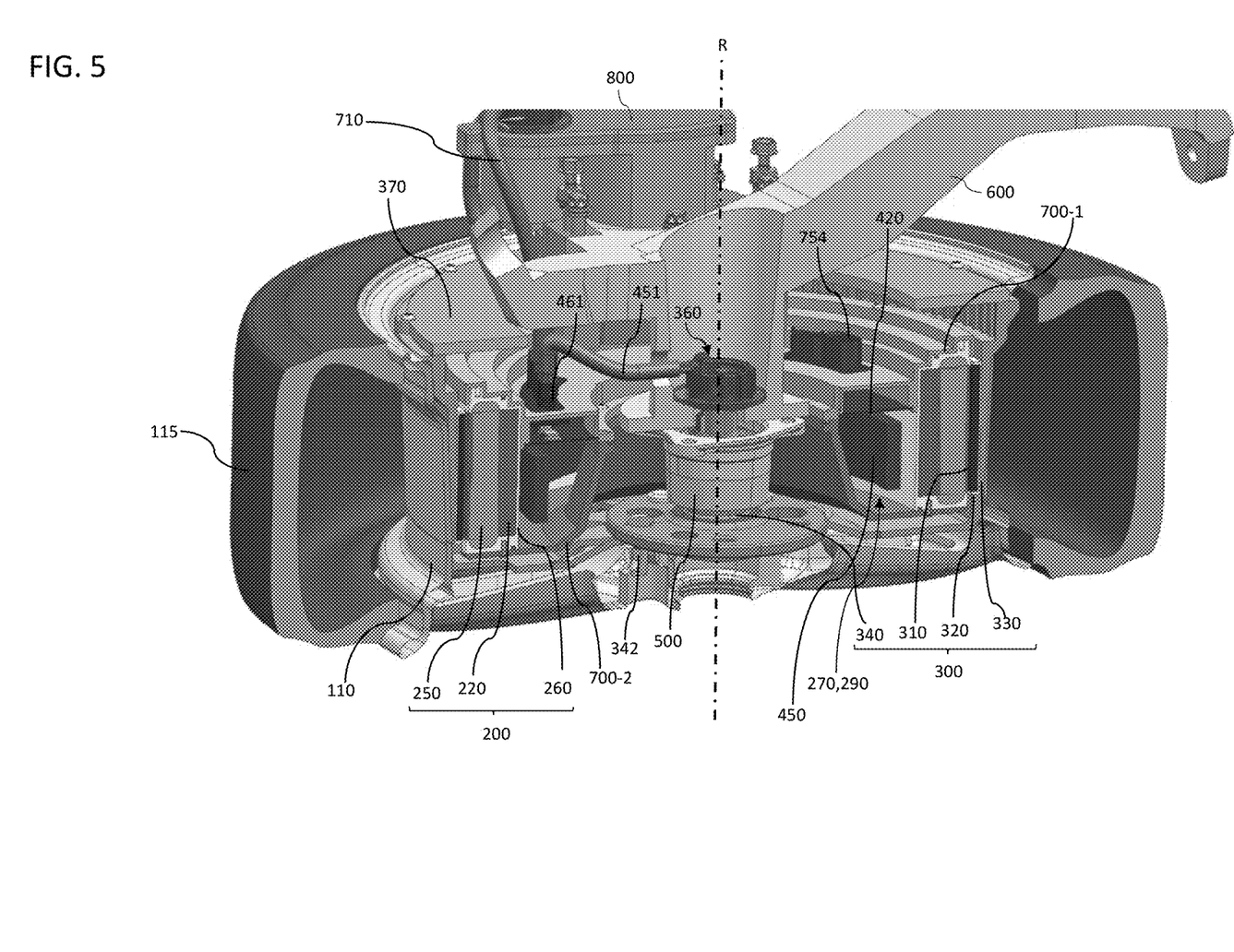
FIG. 5 is a cross-sectional and inside view of a vehicle wheel assembly according to an exemplary embodiment of the present disclosure.

Referring to FIGS. 3-5, the in-wheel motor 100 generally includes a stator 200, and a rotor 300. The stator 200 and the rotor 300 are disposed inside a wheel cavity 112 of FIG. 3. The rotor 300 may be spaced apart from the stator 200 by a radial air gap. The rotor 300 may be disposed concentric with the stator 200. The stator 200 and the rotor 300 each may be disposed about a rotation axis R of the wheel 110. Although some embodiments of the present disclosure show that the stator 200 may be disposed within the rotor 300, the stator 200 may be disposed outside the rotor 300.

Stator & Rotor

The stator 200 includes a stator core 220. The stator core 220 may be generally cylindrical in shape. The stator core 220 (e.g. iron core) may be made of a stack of stator laminations and extend along the rotation axis R. An outer surface of the stator core 220 may be formed by a plurality of stator teeth. The stator teeth of the stator core 220 may be arranged circumferentially and may protrude toward the rotor 300. The stator core 220 may include a substantially circular inner wall 260. The inner wall 260 of the stator core 220 may form an inner cavity within the stator 120 that is configured to receive an electronic device 400.

A winding arrangement for conductors 250 that form one or more electromagnets by carrying an excitation current is comprised in the stator 200. The windings of the conductors 250 are formed on stator poles. Current flowing through the conductors 250 generates a stator electromagnetic flux. The stator electromagnetic flux may be controlled by adjusting the magnitude and frequency of the current flowing through the conductors 250. The conductors 250 may be encapsulated with potting material (e.g. epoxy potting material). Wires or leads from the windings of the conductors 250 extend for connection to the electronic device 400. For example, the conductors 250 of the stator 200 is electrically connected to a first switch module 430 of the electronic device 400 of FIG. 6 via the wires or leads such that the first switch module 430 of the electronic device 400 can control current flowing on the windings of the conductors 250.

The connection structure 600 (e.g. an axle, knuckle or upright) couples the stator 200 to a frame or body 25 of the vehicle 20. The connection structure 600 is arranged to prevent any substantive rotation of the stator 200 relative to other non-rotating elements of the vehicle 20 while allowing the stator 200 to move in other degrees of freedom.

The rotor 300 may include the plurality of permanent magnets 310 preferably arranged around the inside of a rotor core or rotor back iron 320 (e.g. silicon steel, nickel iron, amorphous iron, and the like), which is attached to a rotor housing 330. Alternatively, the permanent magnets 310 may be directly mounted on the rotor housing 330 without the rotor core or rotor back iron 320. The magnets 310 may alternate in magnetic polarity along the radial air gap across from the stator 200.

The stator flux generated by the wiring arrangement of the conductors 250 of the stator 200 and the rotor flux generated by the permanent magnet 310 of the rotor 300 may be distributed in the air-gap between the stator 200 and the rotor 300. Interaction between the stator flux and the rotor flux causes the rotor 300 to rotate relative to the stator 200.

The rotor 300 is attached to the stator 200 or the connection structure 600 (e.g. an axle, knuckle or upright) via a bearing assembly 500. For example, as shown in FIG. 4, a center portion 340 of the rotor 300 (e.g. an outer radial wall of the center portion 340 of the rotor 300) may be rotatably coupled with the bearing assembly 500 and arranged at the rotation axis R of the wheel 110 so that the rotor 300 can rotate around the rotation axis R of the wheel 110. The bearing assembly 500 may include one or more bearings, for instance, but not limited to, a ball bearing or a roller bearing.

For example, the bearing assembly 500 comprises two parts, a non-rotatable part 510 fixed to the stator 200 or the connection structure 600 and a rotatable part 520 fixed to the rotor 300. The rotor 300 is rotationally coupled to the vehicle 20 via the bearing assembly 500 at the center portion 340 of the rotor 300. The rotor housing 330 can be fixed to the center portion 340 of the rotor 300 using bolts 342 to fix the rotor housing 340 to the center portion 340 of the rotor 300 and consequently firmly onto the rotatable part 520 of the bearing assembly 500. Alternatively, the center portion 340 of the rotor 300 is formed integrally with the rotor housing 330 as a single piece body. The center portion 340 of the rotor 300 may protrude from the front portion of the rotor 300 facing the outside of the vehicle 20 toward the vehicle frame or body 25. Although two sets of ball bearings are illustrated in FIG. 5, a single or three or more ball bearing sets of ball bearings or other type of bearings can be used if appropriate.

Motor Position Sensor Assembly & Magnet Assembly

Referring to FIG. 4, a magnet assembly 350 is fixed to the center portion 340 of the rotor 300. For example, the magnet assembly 350 is arranged on the distal end of the center portion 340 of the rotor 300. The magnet assembly 350 may comprise a magnet holder 352. The magnet holder 352 may have an inner space for holding a magnet 354. The magnet 354 is positioned within the inner space of the magnet holder 352 such that the magnet 354 produces magnetic flux which flows from the magnet 354 to a rotary sensor 361. For example, the magnet holder 352 may at least substantially surround the magnet 354. The magnet holder 352 is made of, for example, but not limited to, non-magnetic material such as brass, aluminum, potting material, plastic, a synthetic resin material, stainless steel, copper, and the like. The magnet holder 352 includes a fixing structure or means 356 configured to fixing the magnet 354 to the center portion 340 of the rotor 300. For instance, the fixing structure or means 356 of the magnet holder 352 has an opening which is inserted into the distal end of the center portion 340 of the rotor 300 and a wall that contacts the center portion 340 of the rotor 300 and holds the magnet holder 352 and the center portion 340 of the rotor 300 together. In the magnet holder 352, the non-magnetic material 358 may be disposed between the center portion 340 of the rotor 300 and the magnet 354. In another example, the non-magnetic material 358 may be part of the magnet holder 352. Alternatively, the magnet holder 352 may have an air gap between the center portion 340 of the rotor 300 and the magnet 354.

Instead of the structure of the magnet holder 352 illustrated in FIG. 4, the magnet holder can be implemented as an adhesive made of non-magnetic material. Any material that can hold the magnet 354 and the center portion 340 of the rotor 300 together and reduce leakage magnetic flux from the magnet 354 to the center portion 340 of the rotor 300 can be used for the adhesive.

A motor sensor position assembly 360 may comprise the rotary sensor 361. The rotary sensor 361 may be disposed in sensing relationship with the magnet 354 attached to the center portion 340 of the rotor 300. The rotary sensor 361 may be in close proximity to the magnet 354. For example, the rotary sensor 361 may be positioned adjacent to, or aligned with, the distal end of the center portion 340 of the rotor 300 (or the magnet 354). The rotary sensor 361 is responsive to the rotation of the center portion 340 of the rotor 300 (or the magnet 354). Upon the rotation of the center portion 340 of the rotor 300, the magnetic field generated by the magnet 354 mounted to the center portion 340 of the rotor 300 will appear to the rotary sensor 360 as a rotating magnetic field that may be used to monitor a rotational position, movement, or status of the rotor 300. The rotary sensor 361 measures the magnetic field generated by the magnet 354. The measurements obtained by the rotary sensor 361 are used to calculate, for example, but not limited to, one or more of radial position, rotations per minute (RPM), direction of rotation of the rotor 300 and the like. The rotary sensor 361 may generate an output signal indicative of the detected or monitored result associated with the magnet 354 (or the center portion 340 of the rotor 300) such as magnetic field/flux measurement results. A processor 410 (or an integrated electronic control unit (ECU)) mounted on a circuit board 420 of the electronic device 400 can calculate the radial position, rotations per minute (RPM), direction of rotation of the rotor 300 based on the output signal of the rotary sensor 361. The rotary sensor 361 can be any suitable device(s) for generating signal responsive to the rotation of the center portion 340 of the rotor 300 (or the magnet 354). For example, the rotary sensor 361 can be an analog or digital type sensor responsive to a magnetic field. The rotary sensor 361 may be a Hall effect sensor, a magnetoresisitve (MR) sensor, or any other sensor known in the art with similar capabilities.

A magnetic shield 362 may surround the magnet 354 and the rotary sensor 361. For example, the magnet 354 and the rotary sensor 361 may be positioned at the center, or at least along the same longitudinal axis, of the magnetic shield 362. The magnetic shield 362 may act to encompass the magnetic flux from the magnet 354 to the rotary sensor 361 and also to shield the rotary sensor 361 from any external magnetic field such as stray field or magnetic field from the outside of the magnetic shield and magnetic field generated by the electric motor 100. The magnetic shield 362 may protect the rotary sensor 361 from influences outside the magnetic shield 362. Further, by having the magnetic shield 362 at least substantially surround the magnet 354, the magnetic flux generated from the magnet 354 does not extend out of the magnetic shield 362. The magnetic shield 362 may be cylindrically-shaped. However, a cross-section of the magnetic shield 362 can have any shape such as an oval, square, rectangle, triangle, diamond, and so forth. The magnetic shield 362 is made of, for example, but not limited to, soft magnetic material. The soft magnetic material generally has a small remanence field. Conversely, the soft magnetic material loses most of its magnetization when an applied field is removed. The soft magnetic material may have high saturation flux density (i.e. greater than 0.5 Tesla) and high relative permeability (i.e. greater than 100). Examples of the soft magnetic material include, but are not limited to, pure or soft iron, steel alloy, low carbon steel with carbon less than 4%, Iron-Cobalt (Fe—Co) alloys, Iron-Nickel-Cobalt (Fe—Ni—Co) alloys, or Iron-Nickel (Fe—Ni) alloys such as permalloy. For instance, the magnetic shield 362 may be a hollow steel ring.

The rotary sensor 361 is electrically connected to the electronic device 400, such as the circuit board 420, through a cable, wire or any other suitable means 451 in order to transmit to the integrated processor or ECU 410 the output signal indicative of the detected or monitored result associated with the magnet 354 (or the center portion 340 of the rotor 300) such as magnetic field/flux measurement results, the radial position, RPM, or direction of rotation of the rotor 300. The output signal of the rotary sensor 361 may be used by the integrated processor or ECU 410 to control the electric motor 100 and a brake actuator 800.

Brake Actuator

The vehicle wheel assembly 10 may further comprise the brake actuator 800. The brake actuator 800 may be configured to apply brake to the wheel 110 or the rotor 300 using a variety of ways. The brake actuator 800 may be an electro-mechanical braking system (EMB) actuator. For example, the brake actuator 800 actuates or drives an electric motor included in the brake actuator 800 to engage a brake pad with a brake disc 370. The brake pad may be coupled to the motor of the brake actuator 800 through various coupling means, for example, piston, gear and/or nut-spindle assemblies, but not limited thereto. The brake disc 370 may be fixed or operatively connected to the wheel 110 or the rotor 330 for rotation with the wheel 110 or the rotor 330. The brake actuator 800 may supply braking force to the brake disc 370 of the wheel 110 or the rotor 330. The brake actuator 800 may be fixedly installed to any suitable portion of the vehicle wheel assembly 10, for example, but not limited to, the stator 200 or the connection structure 600 (e.g. an axle, knuckle or upright). Exemplary embodiments of the brake actuator 800 are disclosed in U.S. patent application Ser. No. 16/118,437, entitled "ELECTROMECHANICAL ACTUATOR PACKAGE WITH MULTI-STAGE BELT DRIVE MECHANISM", filed on Aug. 31, 2018, which is all hereby incorporated herein by reference in its entirety.

Although electronics for controlling the brake actuator 800, such as a processor or ECU, switches, inverter, and power supplier, can be arranged inside the package of the brake actuator 800, some exemplary embodiments of the present disclosure can remove the processor or ECU, switches, inverter, and power supplier for controlling the brake actuator 800 from the brake actuator package. Instead, according to certain exemplary embodiments of the present disclosure, the processor or ECU for controlling the brake actuator 800 can be integrated with a processor or ECU for controlling the electric motor 100 as a single integrated processor or ECU. Alternatively, the processor or ECU for controlling the brake actuator 800 separate from the processor or ECU for controlling the electric motor 100 can be mounted to the circuit board 420 disposed in the stator 200, and therefore both the processor or ECU for controlling the brake actuator 800 and the processor or ECU for controlling the electric motor 100 are arranged on the circuit board 420. Further, switches or inverters for controlling power supplied to the brake actuator 800 also can be arranged on the circuit board 420 disposed in the stator 200 instead of the inside of the package of the brake actuator 800.

Electronic Device

Figure 6:
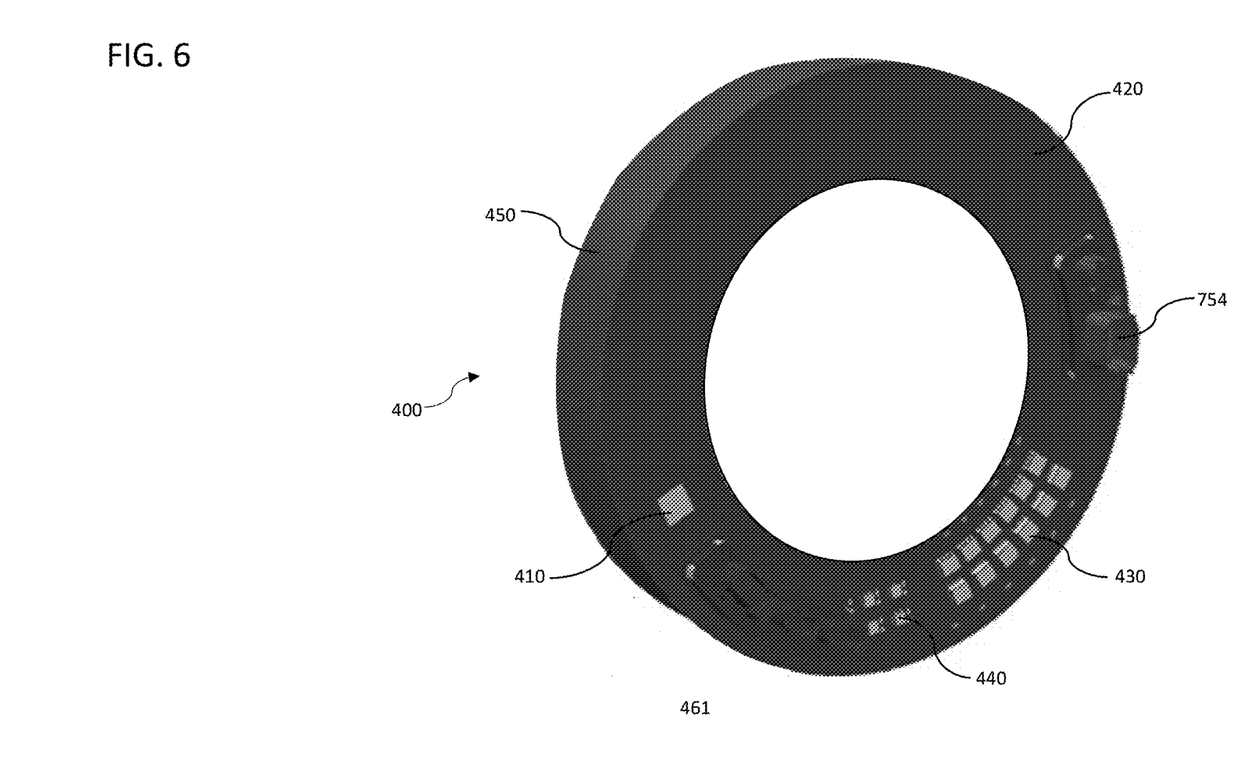
FIG. 6 is a perspective view of an electric device included in a vehicle wheel assembly according to an exemplary embodiment of the present disclosure.

Referring to FIG. 6, the electronic device 100 may comprise the circuit board 420. Any suitable circuitry and electronic components, such as a microprocessor, may be mounted on the circuit board 420. The electronic components carried by the circuit board 420 include a number of switches which may typically comprise one or more semiconductor devices such as metal-oxide-semiconductor field-effect transistors (MOSFETs) or insulated-gate bipolar transistor (IGBTs), or any suitable known switching circuit or current regulator. For example, a first switch module 430 may be configured to control the in-wheel motor 100. The first switch module 430 drives the windings of the conductors 250 of the stator 200. The first switch module 430 may control current supplied to the windings of the conductors 250 of the stator 200 such that the electromagnets in the stator 200 can provide a magnetic field for providing a rotation motion to the permanent magnets 310 of the rotor 300 in response to the current supplied by the first switch member 430. A second switch module 440 may be configured to control power supplied to the brake actuator 800.

The first and second switch modules 430 and 440 may be an inverter which is a circuitry that changes direct current (DC) to alternating current (AC). The DC power is supplied to the first and second switch modules 430 and 440, and the first and second switch modules 430 and 440 may generate a multi-phase (e.g. three-phase) voltage supply for driving the in-wheel motor 100 and the brake actuator 800 in response to control signals of the integrated processor or ECU 410. Each of the first and second switch modules 430 and 440 may include one or more switches such as MOSFETs, IGBTs, or any type of semiconductors, and the number of switches included in the first and second switch modules 430 and 440 may depend upon the number of voltage phases to be applied to the in-wheel motor 100 or the brake actuator 800.

The electronic device 400 may further include a capacitor module 450. The capacitor module 450 may filter current flow and reduce voltage ripple, and distribute the DC power supply to the first and/or second switch modules 430 and 440. To reduce the effects of inductance on the first and second switch modules 430 and 440 when switching current, the capacitor module 450 may be used as a local voltage source for the first and second switch modules 430 and 440. By placing the capacitor module 450 close to the first and second switch modules 430 and 440, the inductance associated with the voltage source is minimized. For example, the capacitor module 450 is mounted on a surface of the circuit board 420 opposite to the other surface of the circuit board 420 on which the first and second switch modules 430 and 440 are mounted. The capacitor module 450 may be an annular type capacitor, but the capacitor module 450 may be of any shape.

The integrated processor or ECU 410 may be configured to control both the electric motor 100 and the brake actuator 800. For example, the integrated processor or ECU 410 may control the first switch module 430 and the second switch module 440 in order to control current or power supplied to the stator 200 of the motor 100 and the brake actuator 800. The integrated processor or ECU 410 may receive the output signal indicative of the detected or monitored result associated with the magnet 354 mounted on the center portion 340 of the rotor 300 from the rotary sensor 361, and the integrated processor or ECU 410 may control the first switch module 430 and the second switch module 440 based on the output signal of the rotary sensor 361.

The processor or ECU 410 may be a single physically-integrated processor or ECU that is configured to control both the electric motor 100 and the brake actuator 800 instead of having two separate processors or ECUs, one for controlling the electric motor 100 and the other for controlling the brake actuator 800. Physical integration of the processors or ECUs for the electric motor 100 and the brake actuator 800 to a single processor or ECU 410 may make easier to synchronize brake control and load, and remove necessity of intercommunication between separate processors or ECUs for the electric motor 100 and the brake actuator 800. And, it may reduce manufacturing cost and result in convenient packing of the vehicle wheel assembly 10.

The integrated processor or ECU 410 is configured to perform a drive operation for providing a drive torque by controlling the in-wheel motor 100 as well as a brake operation for providing a brake torque by controlling either or both of the in-wheel motor 100 and the brake actuator 800. For example, during the brake operation, the integrated processor or ECU 410 controls the in-wheel motor 100 to provide a brake force and/or controls the brake actuator 800 to apply the brake to the wheel 110 or the rotor 300. Generally, most (around 85%) of the braking can be performed by the control of the electric in-wheel motor 100. In case of failure of performing the braking operation of the electric motor 100, the brake actuator 800 may apply the brake to the wheel 110 or the rotor 300.

Alternatively, instead of a single physically-integrated processor or ECU, two separate processors or ECUs, one for controlling the electric motor 100 and the other for controlling the brake actuator 800, may be mounted to the circuit board 420.

The circuit board 420 further includes a connector 461 configured to receive one or more electrical wires or cables 710 electrically connecting between the brake actuator 500 and the circuit board 420, and the circuit board 420 electrically connects one or more of the processor or ECU 410, the first switch module 430 and the second switch module 440 to the connector 461 so that one or more of the processor or ECU 410, the first switch module 430 and the second switch module 440 mounted to the circuit board 420 can be electrically connected to the brake actuator 800. The connector 461 has one or more electrical wires. One end of the electrical wire of the connector 461 may be electrically connected to the circuit board 420, and the other end of the electrical wire of the connector 461 may be a pin which can be connected with an electrical terminal of the electrical wires or cables 710.

Hermetic Enclosure & Two-Phase Dielectric Material

The electronic device 400 may be fixed to the stator 200. For instance, the circuit board 420 is retained in an inner hollow space 280 formed within the stator 200 by any suitable manner, such as by a plurality of clips or snaps integrally formed in the stator 200 and/or the cover 700-1, 700-2 or screws. Covers 700-1, 700-2 are assembled together with the stator 200 so that the inner wall 260 of the stator 200 and the covers 700-1, 700-2 can form a hermetic enclosure 270. The covers 700-1, 700-2 and the stator 200 may be assembled together by any suitable means, for example, but not limited to, bolts 701 and/or adhesive.

The hermetic enclosure 270 formed by the inner wall 260 of the stator 200 and the covers 700-1, 700-2 is a hermetically sealed, leakage-free enclosure in order to prevent the leakage of two-phase dielectric material 290 contained in the hermetic enclosure 270. A center portion of at least one of the covers 700-1, 700-2 may protrude toward the other of the covers 700-1, 700-2 to be coupled to each other. An outer edge portion of each cover 7004, 700-2 is fixed to the stator 200, and an inner edge portion of each cover 700-1, 700-2 is coupled with each other. The circuit board 420 is fixed inside the hermetic enclosure 270 formed by the inner wall 260 of the stator 200 and the covers 700-1, 700-2. Although some embodiments of the present disclosure have two covers 700-1, 700-2, three or more covers can be coupled to the stator 200 to form the hermetic enclosure 270. And, the inner wall 260 of the stator 200 and the covers 700-1, 700-2 are not necessary to be implemented as separate individual pieces, and the inner wall 260 of the stator 200 and the covers 700-1, 700-2 may be implemented as a single piece housing forming the hermetic enclosure.

The two-phase dielectric material 290 is contained within the hermetic enclosure 270 formed by the inner wall 260 of the stator 200 and the covers 700-1, 700-2 in order to cool the electronic device 400 including the processor or ECU 410, the circuit board 420, the first switch module 430, the second switch module 440, the capacitor module 450, and any other electronic components mounted on the circuit board 420. The hermetic enclosure 270 may form a cooling channel allowing the two-phase dielectric material 290 to flow around the electronic device 400 and along the inner wall 260 of the stator 200 within the hermetic enclosure 270. Unwanted non condensable gases (e.g. air) shall also be prevented from entering by the seals. A part or whole of the electronic device 400 is submerged in the two-phase non-conductive liquid in the hermetically sealed leakage-free enclosure 270. For example, 30% to 90% of a volume of the hermetic enclosure 270 may be filled with the two-phase dielectric material 290 to efficiently adjust the temperature of the stator 200 and the electronic device 400 by the phase transition between a liquid state and a gas state, conduction, and convection.

Figure 7:
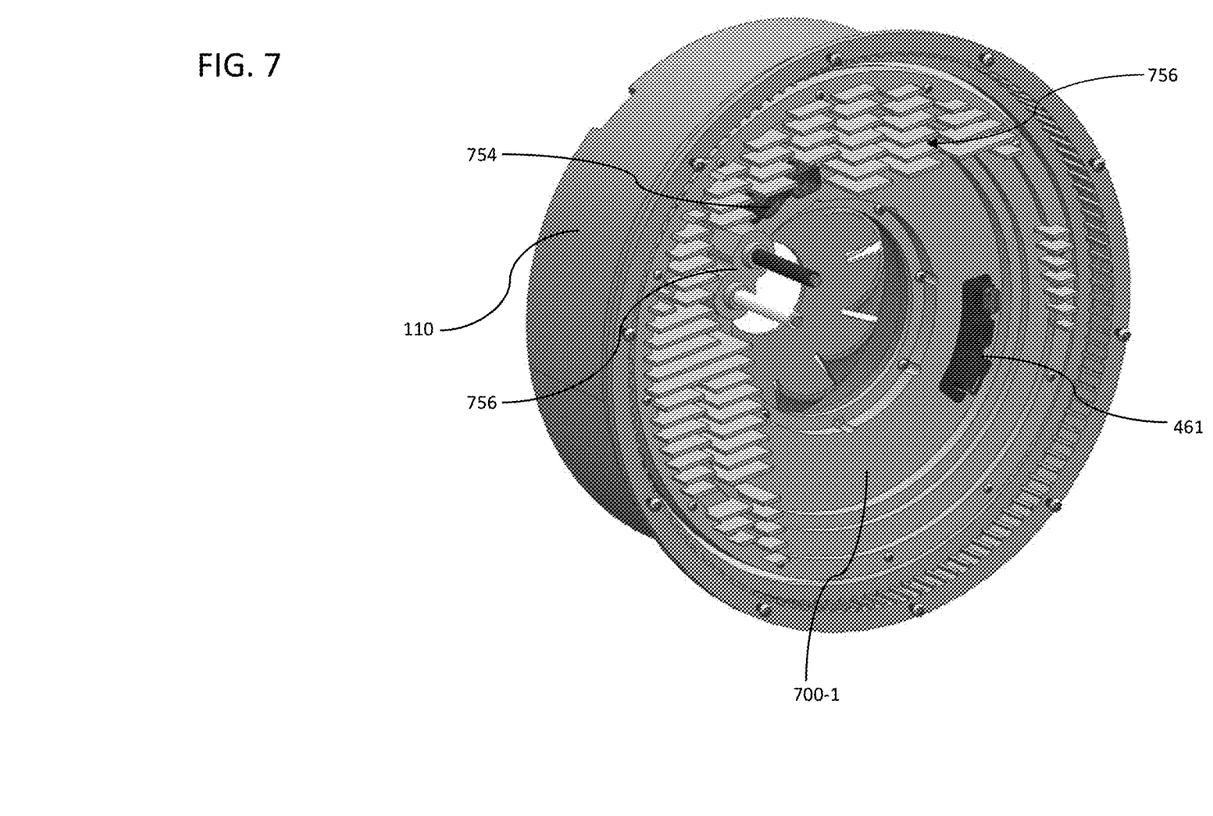
FIG. 7 is a rear perspective view of a vehicle wheel assembly according to an exemplary embodiment of the present disclosure.
Figure 8:
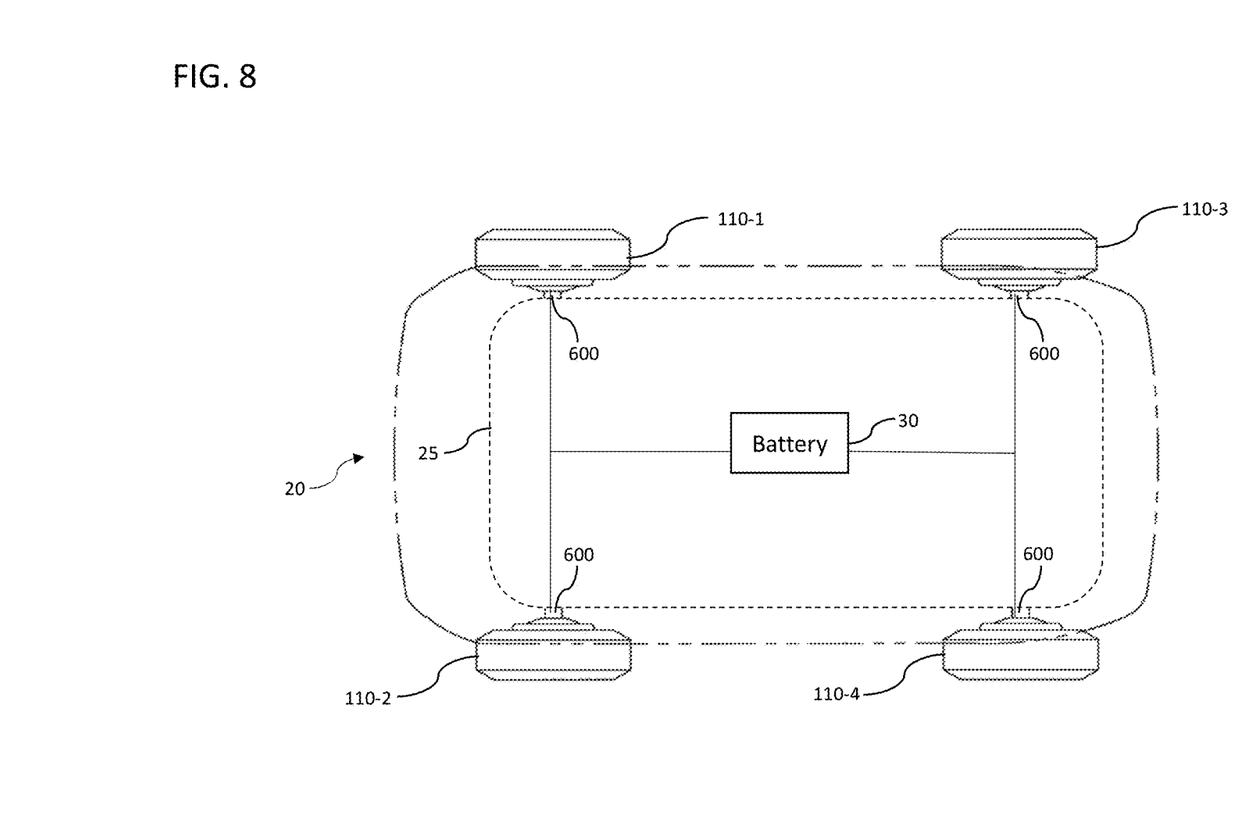
FIG. 8 shows a schematic view of a vehicle according to an exemplary embodiment of the present disclosure.

The two-phase dielectric material 290 can fluidly travel within the hermetic enclosure 270 and is in contact with the inner wall 260 of the stator 200 and the electronic device 400 so that the two-phase dielectric material 290 can get rid of excess heat generated by the stator 200 and the electronic device 400 by transitioning between a liquid phase and a gaseous phase. The two-phase dielectric material 290 may use a low-temperature evaporation process to cool hot electronics and transfer the heat out of the liquid. The heat generated by the stator 200 and the electronic device 400 boils the two-phase dielectric material 290 and changes the phase of the two-phase dielectric material 290 from liquid to gas, and this change pulls the heat away from the stator 200 and the electronic device 400. The two-phase dielectric material 290 in the gas phase contacts the covers 700-1, 700-2 coupled to the stator 200, and is cooled again by a heat exchanging method to allow return into the liquid phase. For example, the temperature of the two-phase dielectric material 290 can be decreased by the covers 700-1, 700-2 and a heat sink 720. As illustrated in FIG. 7, the heat sink 720 may be arranged on an outer surface of at least one of the covers 700-1, 700-2 to discharge the heat extracted from the stator 200 and the electronic device 400 by the two-phase dielectric material 290 to the outside of the hermetic enclosure 270. The heat sink 720 may be provided with heat exchanger fins or other cooling surfaces. The heat exchanger fins of the heat sink 720 may protrude to extend away from the cover 700-1.

The two-phase dielectric material 290 may be a material configured to be transitionable between a liquid phase and a gaseous phase in a predetermined operating temperature range. Those skilled in the art will recognize that the two-phase dielectric material and the operating temperature range can be chosen appropriately for reducing the temperature during the operation of the electric motor 100. The boiling point of the two-phase dielectric material may be, for example, but not limited to, between 30° C. and 100° C. for preventing from deteriorating the device performance and reliability of the electric motors 100. The fluid may be capable of producing more uniform heat distribution (and/or reduced thermal resistivity) and therefore greater heat rejection than might otherwise be possible with heat transport via conduction alone. Beneficial in reducing core maximum temperatures. Furthermore, dielectric material selection can also be tuned to affect pressure of the enclosure via the materials Pressure and Temperature curve/vapor pressure curve.

The two-phase dielectric material 290 has dielectric characteristics that are able to directly contact with electronics without short-circuit. The direct contact with the electronics allows heat to be transferred directly from the electronics into the two-phase dielectric material 290. The two-phase dielectric material 290 are safe for contact with electronics and efficiently and uniformly cool electronics using two-phase immersion cooling. For example, the two-phase dielectric material 290 may be Furan, 2,3,3,4,4-pentafluorotetrahydro-5-methoxy-2,5-bis[1,2,2,2-tetrafluoro-1-(trifluoromethyl)ethyl]—(e.g. 3M™ Novec™) or Propene, 1,1,2,3,3,3-hexa-fluoro, oxidized, polymerized (e.g. Galden® HT 100 of SOLVAY SOLEXIS, Inc.), but not limited thereto. Any two-phase dielectric material which is dielectric and high-performance heat transfer fluid with boiling points ranging from 55° C. to 270° C. can be used.

By having the hermetic enclosure 270 containing the two-phase dielectric material 290 together with the electronic device 400, some exemplary embodiments of the present disclosure can efficiently cool the electronic device 400 and the stator 200 without other means for forced liquid cooling, such as a radiator, hoses, and a pump.

One of the covers 700-1, 700-2 may have the wire 756 for supplying power to the electronic device 400 and electrically connected to the battery 30 of the vehicle 10, and a connector 754 for ground and/or communication with other electronics installed at the vehicle. One end of the electrical wire of the connector 754 may be electrically connected to the circuit board 420, and the other end of the electrical wire of the connector 754 may be a pin which can be connected with an electrical terminal of an electrical wire or cable.

The in-wheel motor 100 may be configured as a three-phase motor. For example, the three-phase motor may have three coils sets, and each coil set consists of a plurality of coil subsets that are connected in series, where for a coil set the magnetic field generated by the respective coil sub-sets has a common phase. Each coil sub-set of the conductors 250 is wound around each tooth of the stator 200. However, the in-wheel motor 100 can include an arbitrary number of phases. Further, the electric motor 100 may be implemented as a dual or quadruple three phase motor for redundancy and thermal management.

The in-wheel motor 100 may preferably have 48 stator slots and 40 rotor poles to achieve higher torque density and lower cogging torque and torque ripple. However, pole and slot numbers can be varied from 4 to 80 and 6 to 90, respectively, if appropriate.

Although the electric motor according to some embodiments of the present disclosure is of the type having a set of coils being part of the stator for attachment to a vehicle, radially surrounded by a rotor carrying a set of permanent magnets for attachment to a wheel, some of the aspects of the present disclosure can be applied to an arrangement having the rotor centrally mounted within radially surrounding coils of the stator. Further, the present disclosure could be incorporated in any form of an electric motor. The electric motor can also be configured as a generator.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A vehicle wheel assembly comprising:
    a wheel for mounting a tire thereon and having an inner space; and
    an in-wheel motor mounted in the inner space of the wheel and configured to drivingly rotate the wheel, the in-wheel motor comprising:
        a rotor coupled to the wheel;
        a stator comprising a wall, wherein the rotor is configured to be rotatable relative to the stator, and the stator is configured to drive the rotor;
        an electronic device comprising a circuit board and electronics mounted on the circuit board, the electronic device configured to control the in-wheel motor;
        two-phase dielectric material; and
        one or more covers coupled with the stator to form a hermetic enclosure, wherein the electronic device and the two-phase dielectric material are contained in the hermetic enclosure formed by the wall of the stator and the one or more covers coupled with stator, and the two-phase dielectric material is in contact with the wall of the stator and the electronic device so that the two-phase dielectric material changes temperature of the stator and the electronic device by transitioning between a liquid phase and a gaseous phase.

2. The vehicle wheel assembly of claim 1, wherein the two-phase dielectric material is configured to be transitionable between the liquid phase and the gaseous phase in a predetermined operating temperature range.

3. The vehicle wheel assembly of claim 1, wherein a boiling point of the two-phase dielectric material is between 30° C. and 100° C.

4. The vehicle wheel assembly of claim 1, wherein 30% to 90% of a volume of the hermetic enclosure formed by the wall of the stator and the one or more covers coupled with stator is filled with the two-phase dielectric material.

5. The vehicle wheel assembly of claim 1, wherein the one or more covers coupled with the stator comprise two covers, wherein at least one of the two covers has a shape protruding toward another of the two covers to be coupled with each other.

6. The vehicle wheel assembly of claim 1, wherein the one or more covers coupled with the stator comprise two covers, each cover having an outer portion fixed to the stator and an inner portion coupled with another cover.

7. The vehicle wheel assembly of claim 1, wherein the one or more covers coupled with the stator have a heat sink on an outer surface of the one or more covers so that heat transferred from the two-phase dielectric material to the one or more covers is dissipated through the heat sink.

8. The vehicle wheel assembly of claim 1, wherein the electronics of the electronic device positioned in the hermetic enclosure formed by the wall of the stator and the one or more covers comprise a single electronic control unit configured to control the first and second switch modules for controlling the in-wheel motor and a brake actuator configured to apply brake to the wheel or the rotor.

9. The vehicle wheel assembly of claim 8, further comprising a wire electrically connecting the circuit board contained within the hermetic enclosure to the brake actuator disposed outside the hermetic enclosure so that the single electronic control unit mounted on the circuit board controls the brake actuator.

10. The vehicle wheel assembly of claim 1, wherein the electronics of the electronic device positioned in the hermetic enclosure formed by the wall of the stator and the one or more covers comprise:
    a first switch module configured to control current supplied to conductors of the stator;
    a second switch module configured to control power supplied to a brake actuator configured to apply brake to the wheel or the rotor; and
    a single electronic control unit configured to control the first and second switch modules.

11. The vehicle wheel assembly of claim 1, wherein the electronics of the electronic device positioned in the hermetic enclosure formed by the wall of the stator and the one or more covers comprise a first switch module configured to control current supplied to conductors of the stator and an electronic control unit configured to control the first switch module for controlling the in-wheel motor.

12. The vehicle wheel assembly of claim 1, wherein the electronics of the electronic device positioned in the hermetic enclosure formed by the wall of the stator and the one or more covers comprise a second switch module configured to control power supplied to a brake actuator configured to apply brake to the wheel or the rotor, and an electronic control unit configured to control the second switch module for controlling the brake actuator.

13. The vehicle wheel assembly of claim 1, wherein the hermetic enclosure formed by the wall of the stator and the one or more covers coupled with stator hermetically encloses the two-phase dielectric material to prevent leakage of the two-phase dielectric material.

14. The vehicle wheel assembly of claim 1, wherein the one or more covers coupled with the stator has a cavity in which a bearing assembly with which the rotor is rotatably coupled is disposed.

15. The vehicle wheel assembly of claim 1, further comprising:
    a magnet mounted to a center portion of the rotor rotatably coupled with a bearing assembly and arranged at a rotation axis of the wheel; and
    a rotary sensor disposed in sensing relationship with the magnet mounted to the center portion of the rotor, the rotary sensor configured to be responsive to rotation of the magnet for generating a signal.

16. The vehicle wheel assembly of claim 15, wherein the rotary sensor and the magnet of the rotor mounted to the center portion of the rotor are arranged to be collinear with the rotation axis of the wheel.

17. The vehicle wheel assembly of claim 15, wherein:
    at least a part of the center portion of the rotor, which is coupled with the bearing assembly and the magnet is mounted to, is positioned inside an inner cavity of the stator, and
    other magnets included in the rotor radially surround an outer surface of the stator.

18. The vehicle wheel assembly of claim 15, further comprising a wire electrically connecting the circuit board contained within the hermetic enclosure and the rotary sensor disposed outside the hermetic enclosure so that an electronic control unit mounted on the circuit board receives the signal generated by the rotary sensor.

19. The vehicle wheel assembly of claim 15, wherein the magnet of the rotor mounted to the center portion of the rotor and the rotary sensor are disposed between the bearing assembly and a vehicle frame or body.

20. The vehicle wheel assembly of claim 1, wherein the in-wheel motor is configured to have 48 stator slots and 40 rotor poles.

* * * * *